United States Patent
Wang et al.

(10) Patent No.: US 10,324,205 B2
(45) Date of Patent: Jun. 18, 2019

(54) DEVICE AND METHOD FOR FULL WAVEFORM INVERSION

(71) Applicant: CGG SERVICES SA, Massy (FR)

(72) Inventors: Min Wang, Singapore (SG); Yi Xie, Singapore (SG); Weiquan Xu, Singapore (SG); Stephen Kefeng Xin, Kuala Lumpur (MY)

(73) Assignee: CGG SERVICES SAS, Massy (FR)

( * ) Notice: Subject to any disclaimer, the term of this patent is extended or adjusted under 35 U.S.C. 154(b) by 163 days.

(21) Appl. No.: 15/342,284

(22) Filed: Nov. 3, 2016

(65) Prior Publication Data
US 2017/0131418 A1 May 11, 2017

Related U.S. Application Data
(60) Provisional application No. 62/251,115, filed on Nov. 5, 2015.

(51) Int. Cl.
  *G01V 1/28* (2006.01)
  *G01V 1/30* (2006.01)
(52) U.S. Cl.
  CPC ............. *G01V 1/282* (2013.01); *G01V 1/303* (2013.01); *G01V 2210/66* (2013.01)
(58) Field of Classification Search
  CPC . G01V 1/28; G01V 1/282; G01V 1/36; G01V 1/303; G01V 1/306; G01V 2210/66; G01V 2210/67
  See application file for complete search history.

(56) References Cited

U.S. PATENT DOCUMENTS

| 4,992,992 A | 2/1991 | Dragoset, Jr. |
| 8,593,904 B2 | 11/2013 | Soubaras |

(Continued)

FOREIGN PATENT DOCUMENTS

| GB | 2503640 A | 1/2014 |
| GB | 2509223 A | 6/2014 |

OTHER PUBLICATIONS

Extended European Search Report in corresponding European Application No. EP 16 30 6432 dated Apr. 18, 2017. (References by Yong Ma, et al. and Binghong He, et al. were made of record in an Information Disclosure Statement submitted on Nov. 3, 2016.).

(Continued)

*Primary Examiner* — Manuel L Barbee
(74) *Attorney, Agent, or Firm* — Patent Portfolio Builders PLLC

(57) ABSTRACT

Computing device, computer instructions and method for determining an image of a surveyed subsurface. The method includes receiving recorded wave fields D recorded with seismic sensors over the subsurface; generating a series of modified recorded wave fields $D_n$ based on the recorded wave fields D; iteratively applying an objective function $F_i$ to (1) one element $D_i$ of the series of modified recorded wave fields $D_n$ and (2) predicted wave fields $P_{mi}$, where "i" is an index associated with a given iteration; calculating with a computing device an updated velocity model $m_{i+1}$ based on a previous velocity model $m_i$ and a step length; and producing the image of the subsurface based on the recorded wave fields D and the updated velocity model $m_{i+1}$. The predicted wave fields $P_{mi}$ are predicted by the previous velocity model $m_i$.

20 Claims, 8 Drawing Sheets

(56) References Cited

U.S. PATENT DOCUMENTS

| | | | | |
|---|---|---|---|---|
| 2011/0090760 | A1* | 4/2011 | Rickett | G01V 1/282 367/73 |
| 2013/0138408 | A1* | 5/2013 | Lee | G06F 17/16 703/2 |

OTHER PUBLICATIONS

C. Bunks et al. "Multiscale Seismic Waveform Inversion", Geophysics, Sep.-Oct. 1995, vol. 60, No. 5, pp. 1457-1473.

D. Hale, "Dynamic Warping of Seismic Images", Geophysics, Mar.-Apr. 2013, vol. 78, No. 2, pp. S105-S115.

B. He et al., "Reflection Full Waveform Inversion With a Corrected Step Length and Application in Land Data Set", SEG Annual Meeting, Houston, Texas, 2013, pp. 929-933.

K. Jiao et al., "Adjustive Full Waveform Inversion", SEG Annual Meeting, New Orleans, Louisiana, 2015, pp. 1091-1095.

Y. Luo et al., "Wave-Equations Traveltime Inversion", Geophysics, May 1991, vol. 56, No. 5, pp. 645-653.

Y. Ma et al., "Wave-Equation Reflection Traveltime Inversion with Dynamic Warping and Full-Waveform Inversion", Geophysics, Nov.-Dec. 2013, vol. 78, No. 6, pp. R223-R233.

R.G. Pratt, "Seismic Waveform Inversion in the Frequency Domain, Part 1: Theory and Verification in a Physical Scale Model", Geophysics, May-Jun. 1999, vol. 64, No. 3, pp. 999-901.

M. Warner et al., "Adaptive Waveform Inversion—FWI Without Cycle Skipping—Theory", 76th EAGE Conference & Exhibition 2014, Amsterdam RAI, The Netherlands, Jun. 16-19, 2014.

H. Baek, et al.; "Velocity estimation via registration-guided least-squares inversion"; Geophysics vol. 79, No. 2, Mar.-Apr. 2014; pp. R79-R89.

H. Baek, et al.; "Registration-guided least-squares waveform inversion"; [downloaded from http://math.mit.edu/icg/papers/EAGE13_RGLS.pdf]; MIT Mathematics Department, Total S.A., Jan. 15, 2013; pp. 1-5.

Office Action in European Application No. 16 306 432.2 dated Jul. 2, 2018.

\* cited by examiner

DEVICE AND METHOD FOR FULL WAVEFORM INVERSION

CROSS-REFERENCE TO RELATED APPLICATIONS

The present application is related to and claims the benefit of priority of U.S. Provisional Application 62/251,115 filed Nov. 5, 2015, the entire contents of which are incorporated herein by reference.

BACKGROUND

Technical Field

Embodiments of the subject matter disclosed herein generally relate to methods and systems and, more particularly, to mechanisms and techniques for mitigating cycle-skipping in full waveform inversion (FWI).

Discussion of the Background

Seismic data acquisition and processing techniques generate a profile (image) of the geophysical structure (subsurface) of the earth. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown for instance in the marine case in FIG. 1, a vessel 110 tows plural detectors 112, which are disposed along a cable 114. Cable 114 and its corresponding detectors 112 are sometimes referred to, by those skilled in the art, as a streamer 116. Vessel 110 may tow plural streamers 116 at the same time. The streamers may be disposed horizontally, i.e., lie at a constant depth $z_1$ relative to the ocean surface 118. Also, plural streamers 116 may form a constant angle (i.e., the streamers may be slanted) with respect to the ocean surface as disclosed in U.S. Pat. No. 4,992,992, the entire content of which is incorporated herein by reference. In one embodiment, the streamers may have a curved profile as described, for example, in U.S. Pat. No. 8,593,904, the entire content of which is incorporated herein by reference.

Still with reference to FIG. 1, vessel 110 may also tow a seismic source 120 configured to generate acoustic waves 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic waves. Parts of reflected acoustic wave 122b (primary) are recorded by various detectors 112 (recorded signals are called traces), while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection. Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

The recorded traces may be used to image the subsurface (i.e., earth structure below surface 124) and to determine the position and presence of reflectors 126, which is associated with the detection of oil and/or gas reservoirs. Although FIG. 1 illustrates a marine streamer seismic acquisition system, an ocean bottom seismic or a land seismic acquisition system is similar to the marine seismic acquisition system in the sense that the ocean bottom seismic system has seismic sensors distributed over the ocean bottom, while the land seismic data acquisition system has seismic sensors distributed over land and seismic sources (e.g., vibrators) are moved by trucks from place to place to generate the seismic waves.

FWI is used to generate a high-resolution and high-fidelity velocity model which improves the migration results and provide direct information about the reservoir. However, because of the highly oscillatory nature of the seismic data and the inherent strong nonlinearity of the objective function, the conventional Least-Squares (LS) FWI often suffers from numerous local minimums, with a very narrow basin of convergence near a global minimum. These detrimental cycle skipping effects occur when the arrival time differences between the predicted and the recorded wave fields are larger than half a cycle of the dominant frequency of the seismic data.

To deal with these shortcomings of the FWI, frequency sweeping methods introduced by Bunks et al. 1995, (Bunks C., F. Saleck, S. Zaleski and G. Chavent, 1995, Multiscale seismic waveform inversion; Geophysics, 60, 1457-1473) and Pratt 1999 (Pratt R. G., 1999, Seismic waveform inversion in the frequency domain, part 1: Theory and verification in a physical scale model; Geophysics, 64, 888-901.) fit data from low to high frequency components to avoid cycle skipping. The success of frequency sweeping FWI strongly relies on some demanding prerequisites, including an accurate initial velocity model and sufficient low frequency components. In field data processing, seismic data below 3 to 4 Hz is often unavailable due to acquisition limitations and noise contamination. On the other hand, travel time tomography, which is often used to provide the initial velocity model for FWI, has its own limitations. Especially within or beneath the shallow velocity anomaly, limited common image gather curvatures are available for Residue Curvature Analysis based tomography. Moreover, the range of updated depth of the ray-based diving wave tomography is typically limited. As a consequence, the cycle skipping issues in FWI are still an open subject.

Thus, there is a need to develop new FWI methods that mitigate cycle-skipping.

SUMMARY

According to an embodiment, there is a method for determining an image of a surveyed subsurface. The method includes a step of receiving recorded wave fields D recorded with seismic sensors over the subsurface, a step of generating a series of modified recorded wave fields $D_n$ based on the recorded wave fields D, a step of iteratively applying an objective function $F_i$ to (1) one element $D_i$ of the series of modified recorded wave fields $D_n$ and (2) predicted wave fields $P_{mi}$, where "i" is an index associated with a given iteration, a step of calculating with a computing device an updated velocity model $m_{i+1}$ based on a previous velocity model $m_i$ and a step length, and a step of producing the image of the subsurface based on the recorded wave fields D and the updated velocity model $m_{i+1}$. The predicted wave fields $P_{mi}$ are predicted by the previous velocity model $m_i$.

According to another embodiment, there is a computing device for determining an image of a surveyed subsurface. The computing device includes an interface for receiving recorded wave fields D recorded with seismic sensors over the subsurface; and a processor connected to the interface. The processor is configured to generate a series of modified recorded wave fields $D_n$ based on the recorded wave fields D; iteratively apply an objective function $F_i$ to (1) one element $D_i$ of the series of modified recorded wave fields $D_n$ and (2) predicted wave fields $P_{mi}$, where "i" is an index associated with a given iteration; calculate an updated velocity model $m_{i+1}$ based on a previous velocity model $m_i$ and a step length; and produce the image of the subsurface based on the recorded wave fields D and the updated velocity model $m_{i+1}$. The predicted wave fields $P_{mi}$ are predicted by the previous velocity model $m_i$.

According to another embodiment, there is a non-transitory computer readable medium including computer executable instructions, wherein the instructions, when executed by a processor, implement instructions for determining an image of a surveyed subsurface according to the methods discussed herein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As noted in the Background section, land or marine seismic surveys can be used to extract rock properties and construct reflectivity images of the subsurface. Such surveys can provide an accurate image of the subsurface structure of the portion of the earth being surveyed. The subsurface structure may be associated with mineral resources and/or hydrocarbons reservoirs. Thus, it is important to have high quality tools for processing the recorded seismic data in order to generate a high-accuracy image of the surveyed substructure. Generating the image of the subsurface is a technological process that is continuously improved by those skilled in the art. The following description continues along this line, i.e., improving the process of generating the image of the subsurface.

FWI is one known method for analyzing seismic data. FWI is able to produce models in a subsurface region of physical properties such as Vp (velocity model) that have high fidelity and are well-resolved spatially. FWI seeks to extract the properties of subsurface rocks from a given seismic dataset recorded at the surface or seabed.

Essentially, the FWI technique generates a two- or three-dimensional velocity model to represent the surveyed subsurface and then attempts to control the properties and parameters of the Earth model to generate estimated seismic data that matches the recorded seismic data.

The velocity model is used to calculate an estimate of the seismic dataset. The predicted seismic dataset is then compared to the recorded seismic dataset. Then, through use of a convergent numerical iteration, the parameters of the velocity model are modified until the predicted seismic dataset matches the recorded seismic data to a sufficient degree of accuracy or until a desired degree of convergence is obtained.

Figure 1:
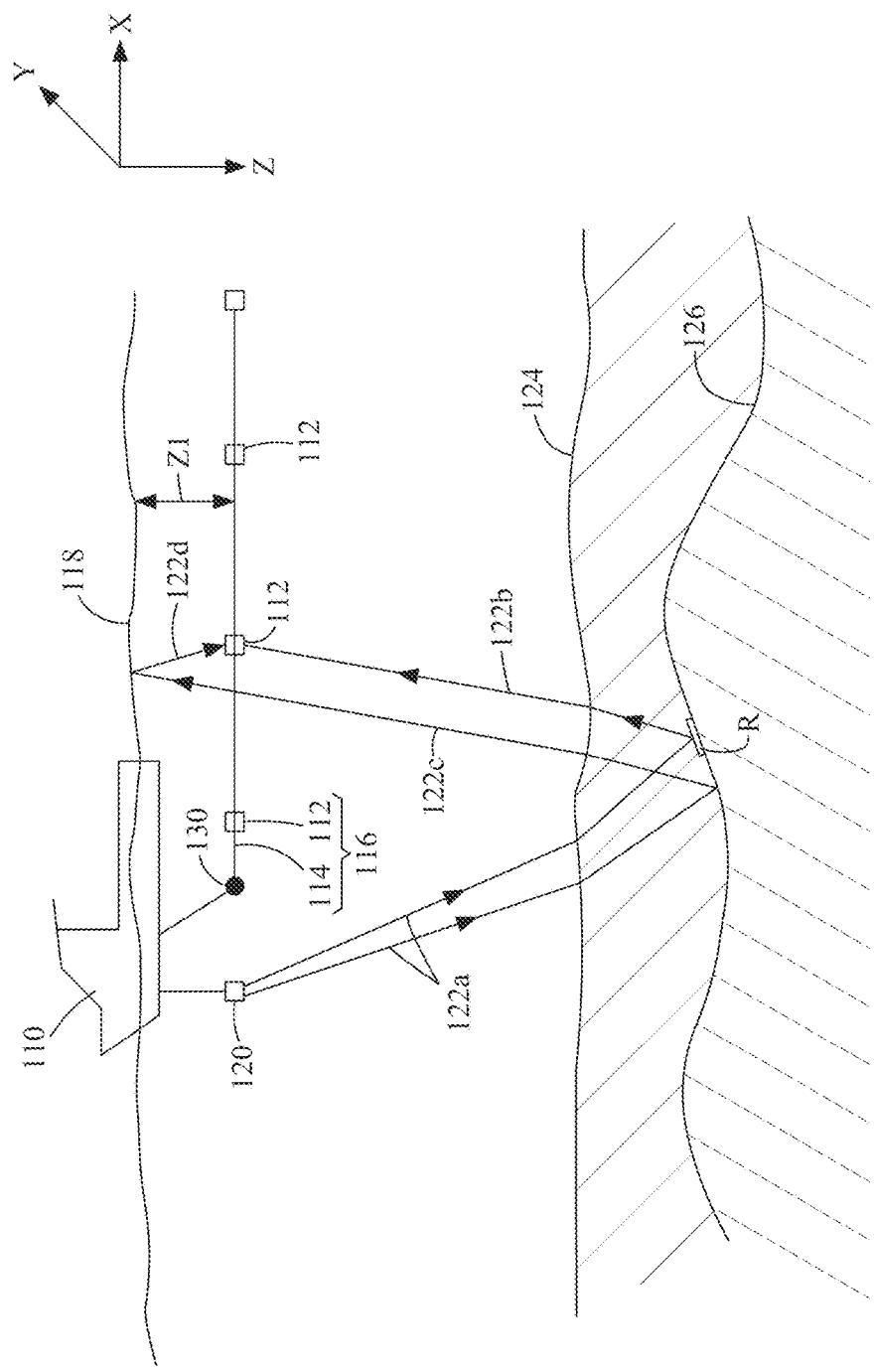
FIG. 1 is a schematic diagram of a conventional marine seismic data acquisition system having a horizontal streamer.
Figure 2:
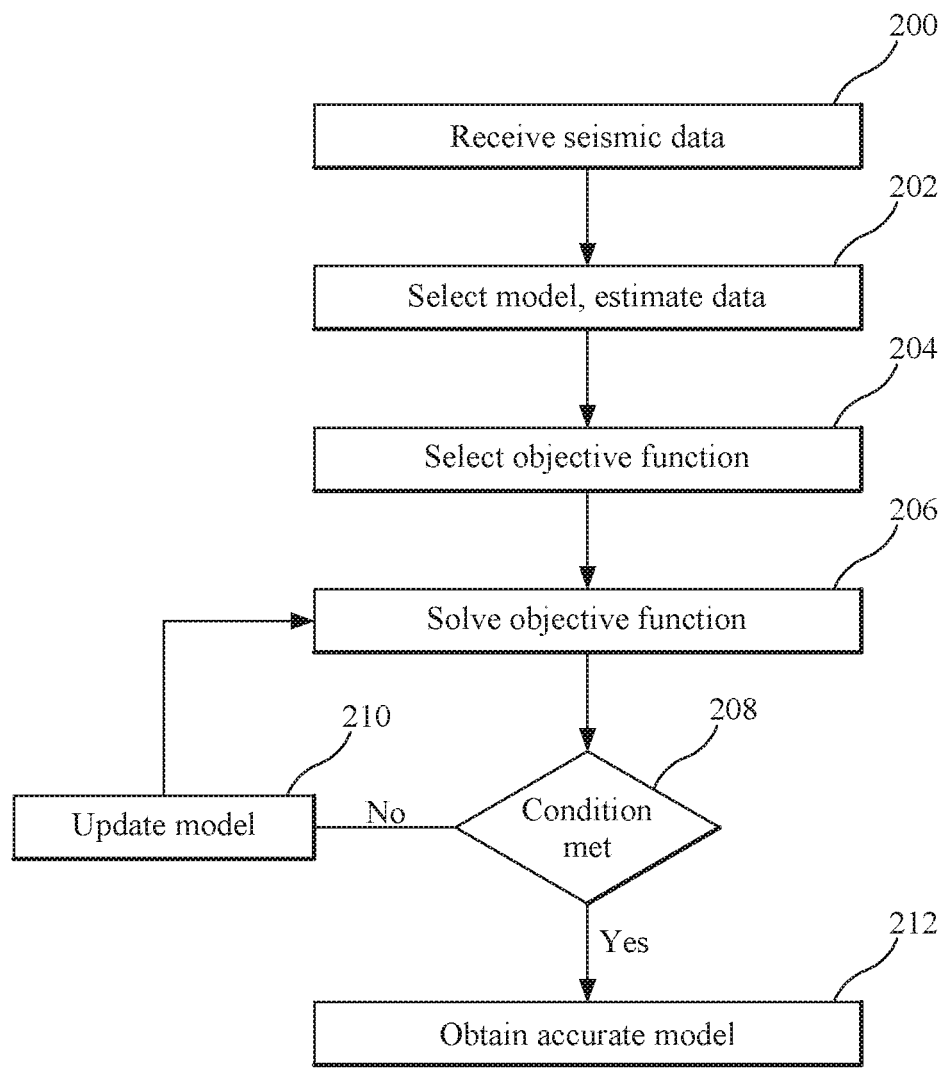
FIG. 2 is a flowchart of an FWI method.

A general method of updating the velocity model with the FWI method is now described with regard to FIG. 2. FWI typically operates on the principle of iteratively updating the starting velocity model to minimize (or maximize) a cost function through repeated calculations. In step 200, recorded seismic data is received. The recorded seismic data may be recorded on land or in a marine environment, as discussed above with regard to FIG. 1. It may be recorded with hydrophones, geophones, accelerometers, or any combination of these and other sensors. In step 202, a velocity model is chosen (e.g., selected from an existing library, calculated based on existing data about the surveyed subsurface, etc.) and seismic data is estimated based on the current velocity model. In step 204, a cost function is defined. The cost function may be a measure of the mismatch or similarity between the recorded seismic data and the estimated seismic data. If the cost function is selected to represent the mismatch between the recorded and estimated seismic data, it may compare traces from the two sets of data, for example, by subtracting one trace from another, i.e., one trace from each set of recorded and estimated seismic data.

Due to the non-linearity in the relationship between the velocity model and the seismic data, the cost function used in FWI may oscillate, rather than have a monotonic behavior. Because of this, it is necessary to have a sufficiently accurate starting velocity model to achieve global minimum convergence. The cost function can be formulated in the frequency domain, the time domain or any other suitable domain.

Traditionally, localized gradient-based methods are used in step 206 to solve the cost function. These methods iteratively update the existing velocity model in a direction that derives from the cost function's direction of steepest descent. For this reason, after the cost function has been calculated in step 206, a given criterion (i.e., a predetermined condition) is checked in step 208. If the predetermined condition is not met, for example, how close the estimated data is to the recorded data, the process advances to step 210 in which the starting velocity model is updated and a new data estimate is calculated. Then, the process returns to step 206 to recalculate the cost function. This FWI is a local iterative inversion scheme and the process makes in step 210 a series of step-wise improvements to the model, which successively reduces the cost function toward the predetermined condition.

The cycle skipping effects that appear in the conventional LS-FWI can be ascribed to two major reasons: 1) mismatched events between the predicted and the recorded wave fields, and 2) numerous local minima of the objective function. A few solutions have been proposed to overcome these problems: Luo and Schuster 1991, (Luo Y. and G. T. Schuster, 1991, Wave-equation traveltime inversion; Geophysics, 56, 645-653.) exploit the convex advantage of travel time in waveform inversion. Hale 2013, (Hale D., 2013, Dynamic warping of seismic images; Geophysics, 78, S105-S115) introduced dynamic warping to recover the travel time difference between wave fields and then inverted the velocity model by minimizing the travel time difference; and M. Warner and L. Guasch 2014, (M. Warner and L. Guasch, 2014, Adaptive Waveform Inversion—FWI Without Cycle Skipping—Theory; 76$^{th}$ EAGE Conference) used Wiener filters to measure the wave field difference and pushed the predicted wave field towards the recorded ones by punishing filter coefficients with large time lag.

The inventors propose herein a new approach to tackle the cycle skipping problem in FWI. According to various methods to be discussed next in more detail, a series of modified recorded wave fields $D_n$ are designed so that the series of modified recorded wave fields $D_n$ connect (1) the initial predicted wave fields $P_{mi}$ calculated based on the initial velocity model $m_i$ to (2) the recorded (i.e., measured or observed) wave fields D. The method then moves the predicted wave fields $P_M$ towards the recorded wave fields D, step by step, along the modified recorded wave field series. As the predicted wave fields $P_{mi}$ progressively converge to the recorded wave fields D, the updated velocity model $m_{i+1}$ progressively converges to the true model as well. The dynamic warping technique (see, e.g., Hale et al. 2013) is used with proper constraints to recover travel time differences r between the predicted and the recorded wave fields. The method then applies the time differences τ (or time shift) to the recorded data D with different scales, which results in a series of wave fields $D_n$ that connect the predicted wave fields $P_{mi}$ and the recorded wave fields D. In the next step, the method uses these modified recorded wave fields $D_n$ from the previously generated series in the framework of LS-FWI and solves a sequence of LS-FWI to avoid cycle skipping effects. To improve the efficiency of the FWI, the inventors propose to employ a convex objective function F for the purpose of calculating an updated step length. The advantages of this method are illustrated on the 2D Marmousi model, with the method successfully overcoming the cycle skipping effects while conventional LS-FWI converges to a spurious model.

The details of these methods are now discussed. From a mathematical point of view, the conventional LS-FWI objective function F (note in the following that a small letter f indicates a frequency while a capital letter F indicates an objective function) is to minimize the least-squares difference between the predicted wave fields $P_{mi}$ and the recorded wave fields D by using equation:

$$F = \|P_{mi} - D\|^2, \qquad (1)$$

where D is the recorded seismic data (or wave fields), $P_{mi}$ is the predicted (or synthetic) wave fields predicted by velocity model $m_i$, and $\|\cdot\|$ is a norm (e.g., an L2 norm). When the initial velocity model $m_i$ is far from accurate, conventional LS-FWI cannot converge directly from P to D with the absence of sufficient low frequency seismic data. One of the reasons for this cycle skipping effect is that the maximum arrival time difference between the predicted wave fields $P_{mi}$ and the recorded wave fields D is larger than a half period of the dominant frequency f.

Figure 3:
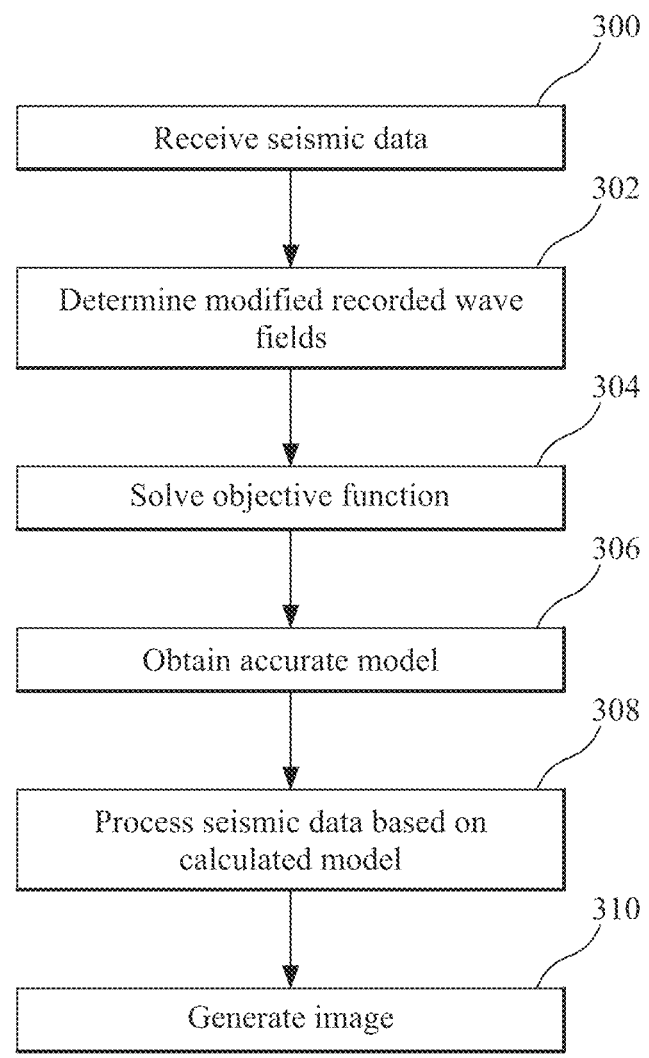
FIG. 3 is a flowchart of an FWI method that uses a series of modified recorded wave fields.

The novel method described herein with regard to FIG. 3, receives in step 300 the recorded wave fields (or seismic data) D. The recorded wave fields may be recorded in various environments (e.g., land, marine, air, etc.) with one or more different sensors (e.g., hydrophones, geophones, accelerometers, etc.). The method introduces/designs/determines in step 302 a series of oscillatory wave fields $D_n$ (also called modified recorded wave fields in the following), which satisfy the following two conditions: 1) connects the predicted wave fields $P_{mi}$ to the recorded wave fields D, and 2) a maximum arrival time difference between two adjacent wave fields $D_i$ and $D_{i+1}$ in the series $D_n$ is smaller than a half period of the dominant frequency f. The term "adjacent" herein means two wave fields $D_i$ and $D_{i+1}$ that have their indexes one after the other, i.e., i and i+1. As a consequence of the series of modified recorded wave fields $D_n$ and the conditions satisfied by them, the method solves in step 304 a sequence of LS-FWI as given by:

$$F_n = \|P_M - D_n\|^2, \qquad (2)$$

where the series $\{D_n\}$ is the designed or determined series of connecting wave fields.

To produce or design the connecting series $D_n$ in step 302, the method needs information regarding the arrival time difference between the predicted wave fields $P_{mi}$ and the recorded wave fields D. This information can be provided by a robust and stable algorithm of dynamic warping (see Hale et al. 2013). The dynamic warping algorithm searches for temporal and spatial variant time shifts to minimize the least-squares difference C between the predicted and shifted recorded wave fields as follow:

$$C(\tau) = \|P_{mi}(x_r, x_s; t) - D[x_r, x_s; t + \tau(x_r, x_s; t)]\|^2, \qquad (3)$$

where $x_r$ is the location of a receiver that records the recorded wave fields D, $x_s$ is the location of a seismic source that generates the recorded wave fields D, t is the travel time of the seismic waves from the location $x_s$ of the source, to the location $x_r$ of the receiver, and τ is the time shift or time difference or arrival time difference. Note that equation (3) indicates the time difference τ as being dependent on the position of the receiver $x_r$, the position of the source $x_s$, and the travel time t between these two positions.

Still with regard to step 302, the method estimates all the possible arrival time differences (i.e., calculates the arrival time difference for all combinations of source and receiver positions) and then selects the maximum T of these arrival time differences as follows:

$$T = \max_{\{x_r, x_s, t\}} \tau(x_r, x_s; t), \qquad (4)$$

where function "max" selects the maximum value from a set of values.

An integer N is now selected by the method to be:

$$N = \min\left\{n \left| \frac{T}{n} < \frac{1}{2f} \right.\right\}, \quad (5)$$

where f is the dominant frequency of the wave fields $P_{mi}$ and D used in the LS-FWI method, and n is a number in a series of natural numbers. Although equation (5) indicates that the frequency f is multiplied by number 2, those skilled in the art would understand that other values (larger than 2) for this number are possible, e.g., 3, 4. etc. Consequently the series of connecting oscillatory wave fields of the modified recorded wave fields are defined as:

$$D_n(x_r, x_s; t) = D\left[x_r, x_s; t + \left(1 - \frac{n}{N}\right)\tau(x_r, x_s; t)\right]. \quad (6a)$$

In other words, the series $D_n$ is defined as the recorded wave fields D in which the travel time t has been shifted with a product of (1) a function of N and n and (2) the travel time differences τ.

To mitigate elastic or density effects on the difference between the predicted and recorded wave fields, the inventors also propose another series of modified wave fields, which are defines as follow:

$$D_n(x_r, x_s; t) = P_{mi}\left[x_r, x_s; t + \frac{n}{N}\tau(x_r, x_s; t)\right]. \quad (6b)$$

This series of modified recorded wave fields $D_n$ is used in equation (2), in step 302, for iteratively calculating the velocity model $m_i$ that best matches the predicted wave fields $P_{mi}$ to the $D_n$. In one application, each iteration uses a different $D_i$ member of the series $D_n$. In another application, a number of iterations use a same member $D_i$ of the series $D_n$ and only then moves to a next member $D_j$.

After an accurate velocity model $m_{i+1}$ is obtained in step 306 as a result of these iterations (note that after each iteration, the velocity model $m_i$ is updated until a good match between the predicted wave fields $P_{mi}$ and the modified recorded wave fields $D_n$ is achieved or until an accurate velocity model is obtained), the method advances to step 308 in which various seismic processing techniques are applied to the recorded wave fields D, based on the calculated velocity model $m_{i+1}$. Then, in step 310, the method generates an image of the subsurface based on the processed wave fields.

Returning to step 304, it is possible to solve a sequence of LS-FWI objective functions $F_n$, as defined in equation (2), and overcome cycle skipping effects. However, the efficiency of this flow can be improved as now discussed. When the first modified recorded wave field $D_1$ of series $D_n$ is used with the objective function $F_1$ to solve the first LS-FWI in the sequence, the resulted adjoint source (i.e., the difference between the predicted and the modified recorded data), generates a substantial velocity perturbation. In view of the fact that $D_1$ is not the final target of the velocity model update, according to an embodiment, it is possible to update the velocity model $m_i$ using a step length as large as possible. The term "step length" is known in the art (see, for example, B. Hu and G Wu., Reflection Full Waveform Inversion with a Corrected Step Length and Application in Land Data set, 2013 SEG Annual Meeting) and it can relate to the inverse of the Hessian matrix, where the Hessian matrix is calculated as a second-order derivative of the objective function $F_n$. The step length is used to update the velocity model $m_i$, by modifying a previously calculated velocity model $m_i$ (from a previous iteration "i") with a term that depends on the step length to obtain the new velocity model $m_{i+1}$. This update may take place during each iteration of the method and in one embodiment each update uses the objective function $F_n$ for calculating/updating the step length.

However, in another embodiment, the step length for updating the velocity model from a previous iteration is not related to the Hessian of objective function $F_n$, as discussed in the previous embodiment, but rather the step length is associated with another objective function (called herein step length objective function) that is not only capable of describing the distance between the predicted and the recorded wave fields, but also will not suffer from numerous local minimums due to the oscillatory feature of the wave fields. For simplicity, in this embodiment, the L2 norm of travel time difference r is used to define the step length objective function $$\overline{F}=\|\tau(x_r,x_s;t)\|^2. \quad (7)$$

Those skilled in the art would understand that other step length objective functions, based on the travel time difference τ, may be used. Because the oscillatory feature of the wave fields is handled in the process of dynamic warping, the new step length objective function $\overline{F}$ correctly describes the distance between the predicted and the recorded wave fields and thus, this new step length objective function has the benefit of convexity even under the circumstance of cycle skipping.

Figure 4:
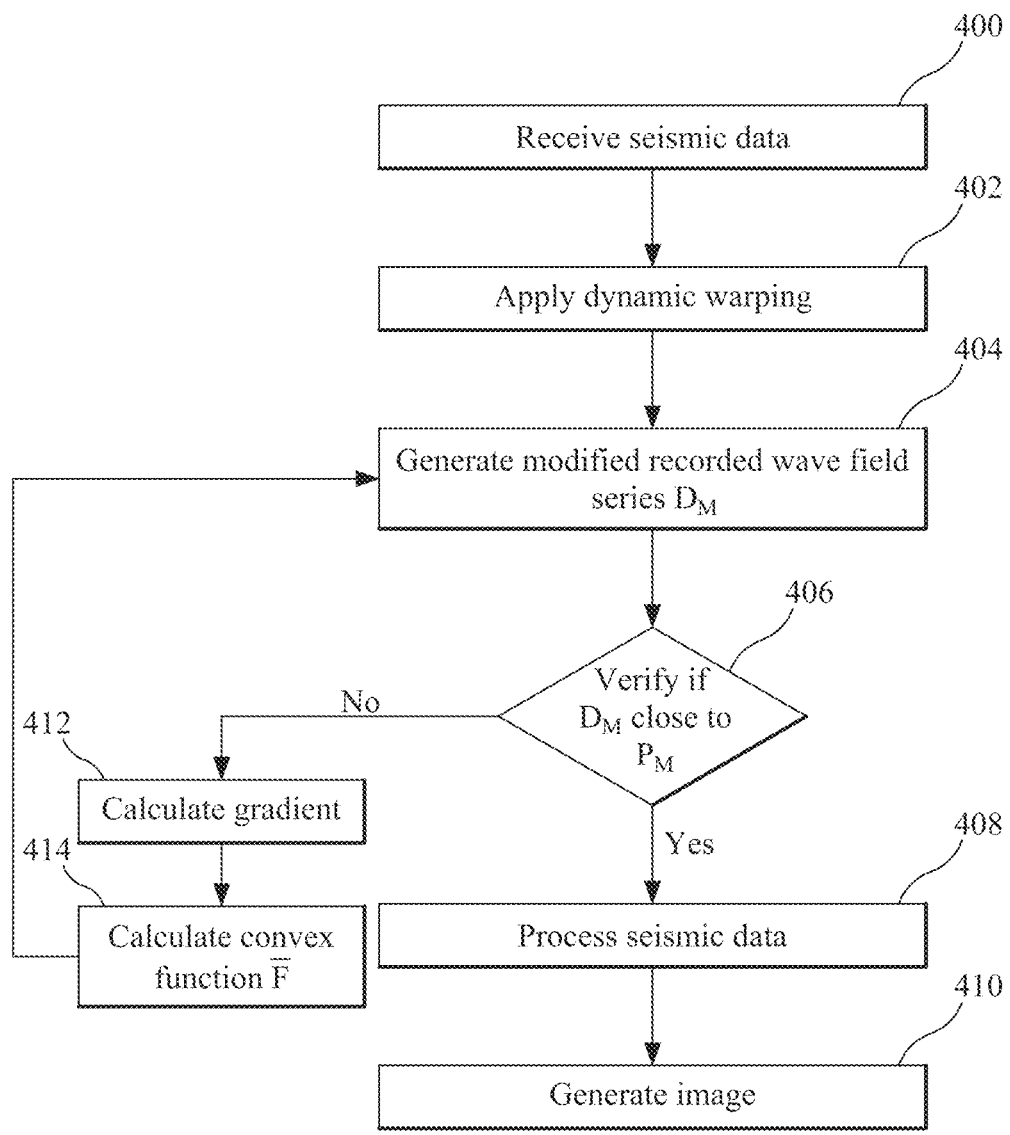
FIG. 4 is a flowchart of an FWI method that uses a series of modified recorded wave fields and a different objective function for a step length.

Thus, according to this embodiment, a method for generating an image of the surveyed subsurface has the following steps (see FIG. 4). In step 400, the seismic data (recorded wave fields D) is received at the processing device that calculates the image. In step 402, a dynamic warping method is applied to measure the travel time differences r between the predicted and recorded wave fields and in step 404 the modified recorded wave field series $D_n$ are generated. In this step, the method also calculates the predicted wave fields $P_{mi}$ and calculates the difference between the predicted wave fields $P_{mi}$ and a current modified recorded wave field $D_i$, based on the objective function of equation (2). In step 406, the current element of the modified recorded wave field series is verified to determine whether the modified recorded wave field is close enough to the predicted wave field $P_{mi}$. If the answer is yes, the current velocity model $m_i$ is considered to be accurate and in step 408 further processing of the recorded wave fields D may be performed, based on the velocity model $m_i$. Then, in step 410, the method generates the image of the subsurface based on the processed wave fields D and the velocity model $m_i$. However, if the answer in step 406 is no, then the method calculates in step 412 a gradient of the objective function described by equation (2), at the current velocity model $m_i$, using one term, e.g., first term $D_1$, from the series $D_n$ in the LS-FWI framework. Then, in step 414, the convex step length objective function $\overline{F}$ is calculated based on the travel time differences to update the step length and a new velocity model $m_{i+1}$ is determined based on the previous velocity model $m_i$ and the updated step length. Note that in one embodiment, the objective function $F_n$ may be used to update the step length instead of the step length objection function F. However, the step length objective function F is considered to be more efficient from calculation resources point of view. The method then returns to step 404 to consider the next element $D_2$ in the series $D_n$ and the above procedure is iteratively repeated until the predicted wave field $P_{mi}$ converges to the modified recorded wave field $D_i$ in step 406 and the updated velocity model converges to the true model.

Figure 5A:
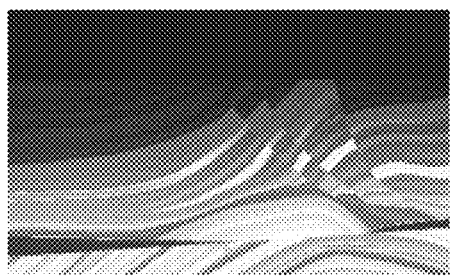
FIG. 5A illustrates a well-known subsurface.
Figure 5B:
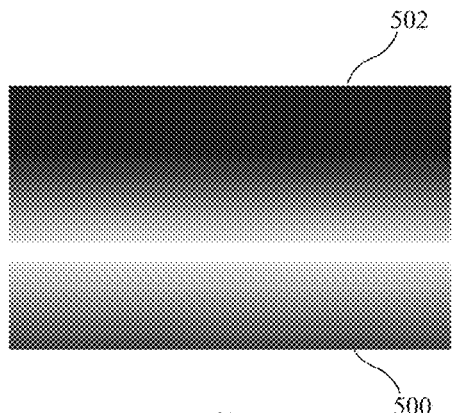
FIG. 5B illustrates an initial velocity model.

To illustrate one or more advantages of the methods discussed above, a well-known synthetic model is processed with a traditional FWI method and the novel method. This model is the well-known 2D Marmousi model. FIG. 5A shows the true model being modified by adding a 1,000 m deep water layer on top of the original Marmousi model. FIG. 5B shows the one dimensional initial velocity model $m_i$ with correct water velocity and linear profile from water bottom 500 to the lower boundary 502. The shots and receivers are allocated uniformly across the upper boundary of the velocity model, with a depth of 24 meters. The water surface is set as free surface to model ghost and free-surface multiples.

Figure 5C:
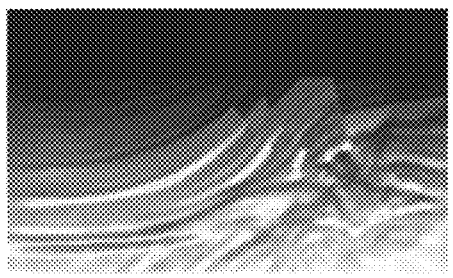
FIG. 5C illustrates the subsurface reconstructed with a traditional FWI method.
Figure 5D:
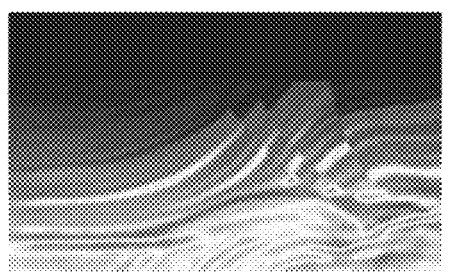
FIG. 5D illustrates the same subsurface reconstructed with a novel FWI method.

The FWI algorithm was run using the full data including transmitted wave, reflection and multiples, iteratively from 4 Hz to 10 Hz. The water velocity is fixed during the inversion procedure by using a mask profile. All the parameter settings are exactly the same for both the conventional LS-FWI method and novel FWI discussed above. At 4 Hz, a significant portion of the data predicted by the initial model is cycle skipped. As can be seen from FIG. 5C, the conventional FWI is unable to recover the correct model in a large area. Due to cycle skipping effects, the subsurface geological structure is significantly distorted. On the other hand, FIG. 5D shows the result of dynamic warping FWI applied to a same data set with the same inversion procedure. Dynamic warping FWI successfully avoids cycle skipping effects and correctly recovers the true model.

Figure 6:
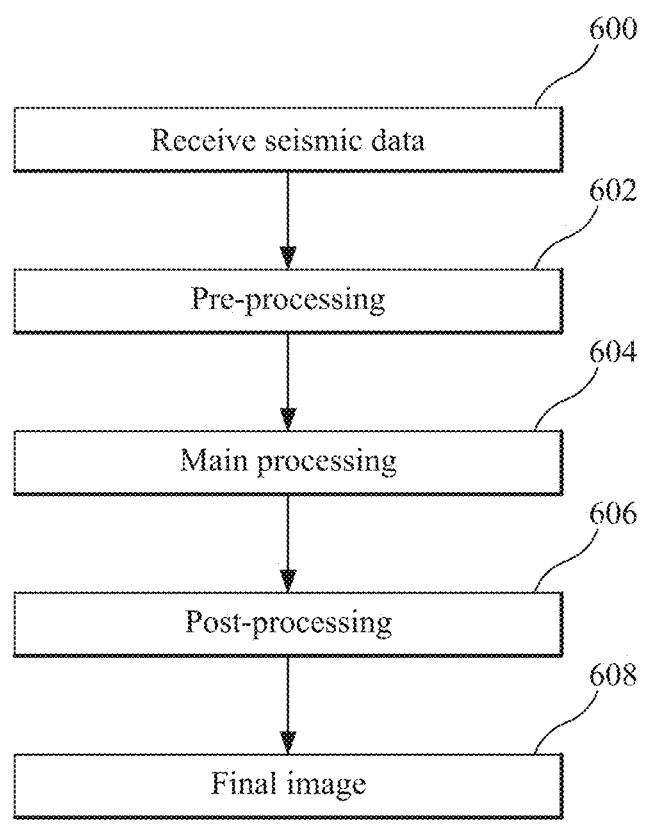
FIG. 6 is a flowchart of a method for processing seismic data.

Step 308 in FIG. 3 or step 408 in FIG. 4 are now discussed in more detail. Seismic data D may be processed in a corresponding processing device for generating an image of the surveyed subsurface. For example, seismic data D may be received in step 600 of FIG. 6 at the processing device. In step 602, pre-processing methods are applied, e.g., demultiple, signature deconvolution, trace summing, vibroseis correlation, resampling, etc. In step 604, the main processing takes place, e.g., deconvolution, amplitude analysis, statics determination, common middle point gathering, velocity analysis, normal move-out correction, muting, trace equalization, stacking, noise rejection, amplitude equalization, etc. In step 606, final or post-processing methods are applied, e.g. migration, wavelet processing, inversion, etc. In step 608 the final image of the subsurface may be generated.

Figure 7:
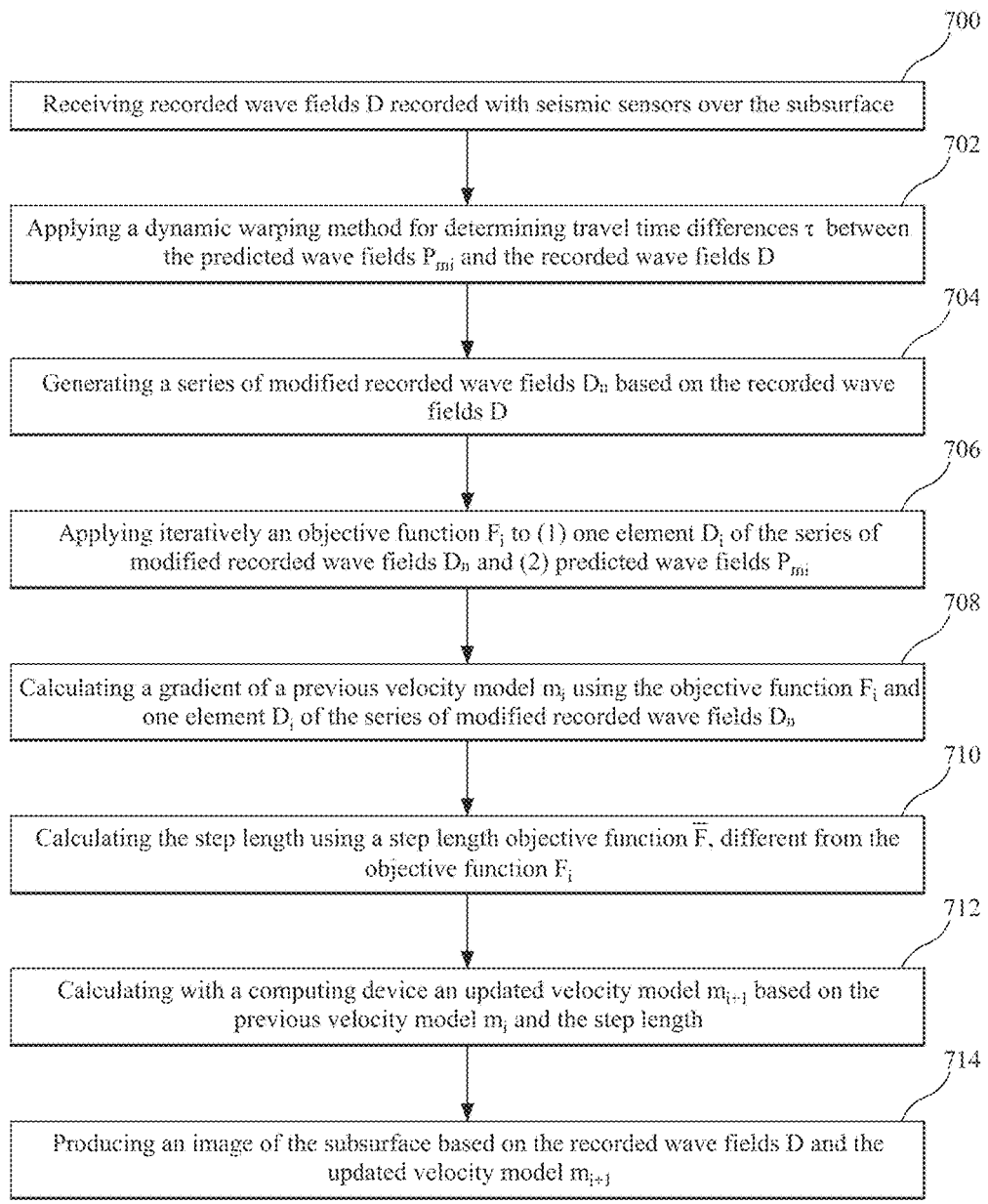
FIG. 7 is a flowchart of an FWI method that uses two different objective functions for generating an image of a subsurface.

FIG. 7 illustrates a specific application of the series of modified recorded wave fields $D_n$ for updating a velocity model and generating an image of the subsurface. The method includes a step 700 of receiving recorded wave fields D recorded with seismic sensors over the subsurface, a step 702 of applying a dynamic warping method for determining travel time differences r between the predicted wave fields $P_{mi}$ and the recorded wave fields D, a step 704 of generating a series of modified recorded wave fields $D_n$ based on the recorded wave fields D and travel time differences τ, a step 706 of applying iteratively an objective function $F_i$ to (1) one element $D_i$ of the series of modified recorded wave fields $D_n$ and (2) predicted wave fields $P_{mi}$, a step 708 of calculating a gradient of a previous velocity model $m_i$ using the objective function $F_i$ and one element $D_i$ of the series of modified recorded wave fields $D_n$, a step 710 of calculating the step length using a step length objective function F, different from the objective function $F_i$, a step 712 of calculating with a computing device an updated velocity model $m_{i+1}$ based on the previous velocity model $m_i$ and the updated step length, and a step 714 of producing an image of the subsurface based on the recorded wave fields D and the updated velocity model $m_{i+1}$. The predicted wave fields $P_{mi}$ are predicted by the previous velocity model $m_i$. Although the method discussed above recites steps 700 to 714 in order, those skilled in the art should understand that the steps may be performed in a different order. In one application, less steps may be performed to achieve the image, for example, steps 700, 704, 706, 712 and 714. Other combinations of steps are also possible.

The dynamic warping method minimizes a least-square difference between the predicted wave fields $P_{mi}$ and the recorded wave fields D to calculate the travel time differences τ. Step 704 may include estimating a maximum travel time difference T from the travel time differences τ, defining an integer N based on the maximum travel time difference T and a dominant frequency f of the recorded wave fields D, and calculating the series of modified recorded wave fields $D_n$ as the recorded wave fields D in which a time t is replaced with a product of (1) a function of N and n and (2) the travel time differences τ.

In one application, the objective function $F_n$ is applied to (1) one element $D_i$ of the series of modified recorded wave fields $D_n$ and (2) the predicted wave fields $P_{mi}$, but not to the recorded wave fields D.

In another application, the step length objective function F is based on the travel time differences τ. In one application, the step length objective function F is an L2 norm of the travel time differences τ.

In still another embodiment, the step of calculating includes calculating a gradient of the previous velocity model using the objective function $F_i$ and the one element $D_i$ of the series of modified recorded wave fields $D_n$, and calculating the step length using an inverse of a Hessian of the objective function $F_i$.

According to an embodiment, hydrophone and/or particle velocity data collected from receivers (located on streamers, ocean bottom cables, autonomous vehicles, etc.) are processed according to one or more of the embodiments discussed above. Note that in the field of oil and gas, there are well-established processes for taking seismic raw data and applying various known processing steps, e.g., migration, FWI, denoising, deghosting, etc., for generating an image of the surveyed subsurface. Based on this image, which can be represented in print, on a screen, in a tabular way, etc., an oil and gas reservoir interpreter determines whether oil and/or gas is present in the surveyed subsurface and advises an oil and gas company where to drill a well. The embodiments discussed above improve this technological process of detecting oil and/or gas reservoirs by mitigating cycle-skipping, which results in a more accurate subsurface image and hence reduced cost associated with the drilling process.

Figure 8:
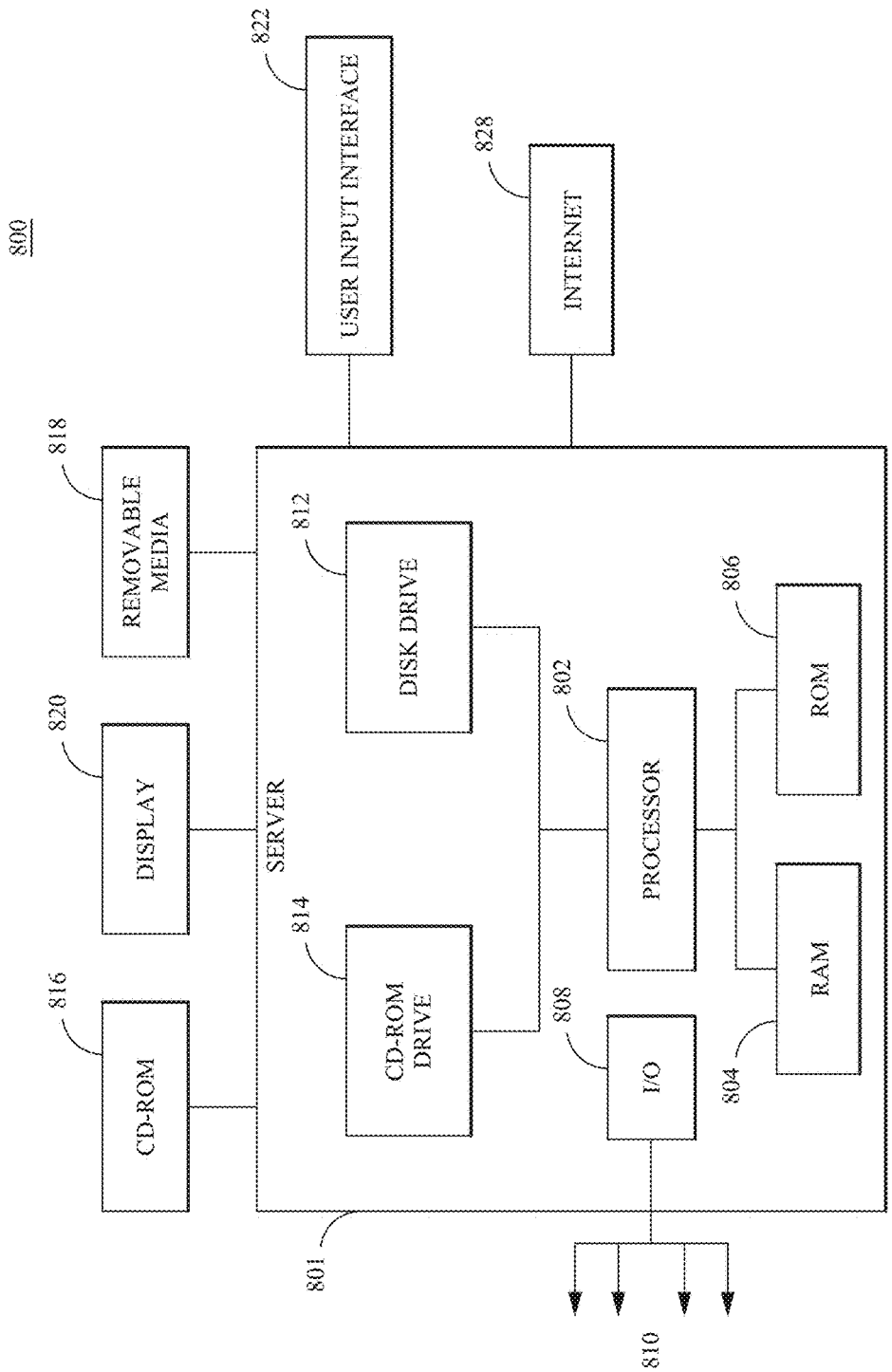
FIG. 8 is a schematic diagram of a computing device that can implement any of the methods discussed herein.

The above-discussed procedures and methods may be implemented in a computing device as illustrated in FIG. 8. Hardware, firmware, software or a combination thereof may be used to perform the various steps and operations described herein. Computing device 800 of FIG. 8 is an exemplary computing structure that may be used in connection with such a system.

Exemplary computing device 800 suitable for performing the activities described in the exemplary embodiments may include a server 801. Such a server 801 may include a central processor (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors, etc. The server may be part of a larger network configuration as in a global area network (GAN) such as the Internet 828, which allows ultimate connection to various landline and/or mobile computing devices.

The disclosed exemplary embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining an image of a surveyed subsurface, the method comprising:
   receiving recorded wave fields D recorded with seismic sensors over the subsurface;
   iteratively performing in each iteration i until a predetermined criterion is met:
      generating a series of modified recorded wave fields $D_n$ based on the recorded wave fields D, wherein a distance between adjacent values in the series is smaller than a half of a dominating frequency f,
      building objective functions $F_j$ measuring distance between (1) one element $D_i$ of the series of modified recorded wave fields $D_n$ and (2) predicted wave fields $P_m$ calculated using a velocity model $m_i$ used in a current iteration and
      calculating with a computing device an updated velocity model $m_{i+1}$ by solving a sequence of least square full wave inversions based on the objective functions $F_j$, wherein velocity model intermediary updates are limited using a step length; and
   producing the image of the subsurface based on the recorded wave fields D and the updated velocity model $m_{i+1}$ to locate mineral resources and/or hydrocarbon reservoirs,
   wherein the modified recorded wave fields $D_n$ are between the recorded fields D and the predicted wave fields $P_{mi}$.

2. The method of claim 1, wherein the step of generating further comprises:
   applying a dynamic warping method for determining travel time differences τ between the predicted wave fields $P_{mi}$ and the recorded wave fields D.

3. The method of claim 2, wherein the dynamic warping method minimizes a least-square difference between the predicted wave fields $P_{mi}$ and the recorded wave fields D to calculate the travel time differences τ.

4. The method of claim 2, further comprising:
   estimating a maximum travel time difference T from the travel time differences τ;
   defining an integer N based on the maximum travel time difference T and a dominant frequency f of the recorded wave fields D; and
   calculating the series of modified recorded wave fields $D_n$ as being the recorded wave fields D in which a time t is shifted with a product of (1) a function of N and n and (2) the travel time differences τ,
   wherein n is another integer.

5. The method of claim 1, wherein the objective function $F_n$ is not applied to the recorded wave fields D.

6. The method of claim 1, wherein the step of calculating comprises:
   calculating a gradient of the previous velocity model $m_i$ using the objective function $F_i$ and the one element $D_i$ of the series of modified recorded wave fields $D_n$; and
   calculating the step length using a step length objective function $\overline{F}$, different from the objective function $F_i$.

7. The method of claim 6, wherein the step length objective function $\overline{F}$ is based on the travel time differences τ.

8. The method of claim 6, wherein the step length objective function F is an L2 norm of the travel time differences τ.

9. The method of claim 1, wherein the step of calculating comprises:
   calculating a gradient of the previous velocity model $m_i$ using the objective function $F_i$ and the one element $D_i$ of the series of modified recorded wave fields $D_n$; and
   calculating the step length using an inverse of a Hessian of the objective function $F_i$.

10. A computing device for determining an image of a surveyed subsurface, the computing device comprising:
    an interface for receiving recorded wave fields D recorded with seismic sensors over the subsurface; and
    a processor connected to the interface and configured to perform iteratively in each iteration i until a predetermined criterion is met:

generating a series of modified recorded wave fields $D_n$ based on the recorded wave fields D, wherein a distance between adjacent values in the series is smaller than a half of a dominating frequency f, building objective functions $F_j$ measuring distance between (1) one element $D_j$ of the series of modified recorded wave fields $D_n$ and (2) predicted wave fields $P_{mi}$, calculated using a velocity model $m_i$ used in a current iteration, and calculating an updated velocity model $m_{i+1}$ by solving a sequence of least square full wave inversions based on the objective functions $F_j$, wherein velocity model intermediary updates are limited using a step length; and produce the image of the subsurface based on the recorded wave fields D and the updated velocity model $m_{i+1}$, wherein the modified recorded wave fields $D_n$ are between the recorded fields D and the predicted wave fields $P_{mi}$.

11. The computing device of claim 10, wherein the processor is further configured to:
apply a dynamic warping method for determining travel time differences $\tau$ between the predicted wave fields $P_{mi}$ and the recorded wave fields D.

12. The computing device of claim 11, wherein the dynamic warping method minimizes a least-square difference between the predicted wave fields $P_{mi}$ and the recorded wave fields D to calculate the travel time differences $\tau$.

13. The computing device of claim 11, wherein the processor is further configured to:
estimate a maximum travel time difference T from the travel time differences $\tau$;
define an integer N based on the maximum travel time difference T and a dominant frequency f of the recorded wave fields D; and
calculate the series of modified recorded wave fields $D_n$ as being the recorded wave fields D in which a time t is shifted with a product of (1) a function of N and n and (2) the travel time differences $\tau$,
wherein n is another integer.

14. The computing device of claim 10, wherein the objective function $F_n$ is not applied to the recorded wave fields D.

15. The computing device of claim 10, wherein the processor is further configured to:
calculate a gradient of the previous velocity model $m_i$ using the objective function $F_i$ and the one element $D_i$ of the series of modified recorded wave fields $D_n$; and
calculate the step length using a step length objective function $\overline{F}$, different from the objective function $F_i$.

16. The computing device of claim 15, wherein the step length objective function $\overline{F}$ is based on the travel time differences $\tau$.

17. The computing device of claim 15, wherein the step length objective function $\overline{F}$ is an L2 norm of the travel time differences $\tau$.

18. The computing device of claim 10, wherein the processor is further configured to:
calculate a gradient of the previous velocity model $m_i$ using the objective function $F_i$ and the one element $D_i$ of the series of modified recorded wave fields $D_n$; and
calculating the step length using an inverse of a Hessian of the objective function $F_i$.

19. A non-transitory computer readable medium including computer executable instructions, wherein the instructions, when executed by a processor, implement instructions for determining an image of a surveyed subsurface, the instructions comprising:
receiving recorded wave fields D recorded with seismic sensors over the subsurface;
iteratively performing in each iteration i until a predetermined criterion is met
generating a series of modified recorded wave fields $D_n$ based on the recorded wave fields D, wherein a distance between adjacent values in the series is smaller than a half of a dominating frequency f,
building objective functions $F_i$ $F_j$ measuring distance between (1) one element $D_j$ of the series of modified recorded wave fields $D_n$ and (2) predicted wave fields $P_{mi}$ calculated using a velocity model $m_i$ used in a current iteration, and
calculating with a computing device an updated velocity model $m_{i+1}$ by solving a sequence of least square full wave inversions based on the objective functions $F_j$, wherein velocity model intermediary updates are limited using a step length; and
producing the image of the subsurface based on the recorded wave fields D and the updated velocity model $m_{i+1}$,
wherein the modified recorded wave fields $D_n$ are between the recorded fields D and the predicted wave fields $P_{mi}$.

20. The medium of claim 19, further comprising:
calculating the step length using either a step length objective function $\overline{F}$, different from the objective function $F_i$, or an inverse of a Hessian of the objective function $F_i$.

* * * * *